3,282,928
1,11-IMINOESTRATETRAENES
Edward Warren Cantrall, New City, Ransom Brown Conrow, Pearl River, and Seymour Bernstein, New City, N.Y., assignors to American Cyanamid Company, Stamford, Conn., a corporation of Maine
No Drawing. Filed Apr. 23, 1964, Ser. No. 362,194
17 Claims. (Cl. 260—239.5)

This invention relates to new steroid compounds. More particularly, it relates to 1,11-iminoestra-1,3,5(10),9(11)-tetraenes and their preparation.

The novel steroids of this invention can be illustrated by the following formula:

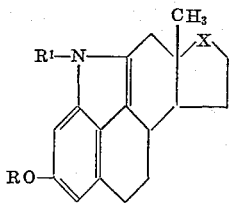

wherein R is selected from the group consisting of hydrogen and lower alkyl; R' is selected from the group consisting of hydrogen, lower alkyl, lower alkanoyl, mono-nuclear aroyl, and lower alkoxy mono-nuclear aroyl; X is selected from the group consisting of

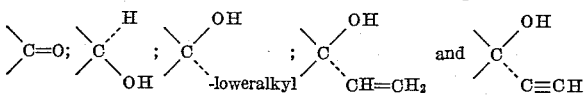

and acid addition and quaternary ammonium salts thereof.

The present compounds are, in general, crystalline solids relatively insoluble in organic solvents such as lower alkyl alcohols, acetone, ethyl acetate, benzene, toluene, chloroform, ether, petroleum ether and the like.

The present compounds which are described broadly as 1,11-iminoestra-1,3,5(10),9(11)-tetraenes substituted in the 17-position can be made from the appropriate 1,11-iminoestratrienes by heating with palladium-on-carbon catalyst. The 1,11-iminoestra-1,3,5(10),9(11)-tetraenes are obtained from the corresponding 1,11-iminoestra-1,3,5(10)-trienes described and claimed in our copending application Serial No. 362,185, filed April 23, 1964 by heating the latter with palladium-on-carbon catalyst in the presence of a solvent.

Using the procedure described hereinafter among the 4-amino-derivatives, which may be used as starting materials, are the following: 4-amino-3-methoxy-19-norpregna-1,3,5(10)-trien-20-one; 4-amino - 11β - acetoxy-3-methoxyestra-1,3,5(10)-trien-17-one; 4-amino - 17,20;20,21-bismethylenedioxy-3-methoxy - 19 - norpregna - 1,3,5 (10)-trien-11β-ol 11 - acetate; 4 - amino-3-methoxyestra-1,3,5(10)-trien-16α,17β-diol 16,17-diacetate and 4-amino-3-methoxyestra-1,3,5(10)-trien-17β-ol-16-one 17-acetate.

The above compounds are prepared from the corresponding compounds lacking a 4-amino substituent by nitration (nitric acid–acetic acid) and methylation (dimethylsulfate), followed by reduction (sodium hydrosulfite), e.g., estrone→4 - nitroestrone→4 - nitroestrone methyl ether→4-aminoestrone methyl ether.

The 4-amino steroids described above may be transformed into the following 1-amino compounds by methods described hereinafter: 1-amino-4-methoxyestra-1,3,5 (10)-trien-17-one; 1 - amino-3-methoxy-19-norpregna-1, 3,5(10)-trien-20-one; 1 - amino-11β-acetoxy-3-methoxyestra-1,3,5(10)-trien-17-one; 1 - amino - 17,20;20,21-bismethylenedioxy-3 - methoxy - 19 - norpregna - 1,3,5(10)-trien-11β-ol 11-acetate; 1 - amino-3-methoxyestra - 1,3,5 (10)-trien-16α,17β-diol 16,17-diacetate; 1-amino-3-methoxyestra-1,3,5(10)-trien-17β-ol-16-one 17-acetate.

The 1-amino-estratrienes described above on treatment with an alkali metal nitrite under acid conditions at a low temperature yield diazonium salts which upon treatment with alkali metal azides will produce for example 1-azido-3-methoxy-1,3,5(10)-estratrien-17-one. The latter compound on heating with hexadecane in an oxygen-free atmosphere will produce 1,11-imino-3-methoxyestra-1,3,5(10)-trien-17-one. The latter may also be prepared by irradiating with ultraviolet light a benzene solution of the 1-azido-compound. The hydrogen atom on the 1,11-imino group may be replaced by a lower alkanoyl group by reaction with a lower alkanoyl chloride or anhydride, and by a lower alkyl group by reaction with an alkyl halide in the presence of an alkali metal hydride.

The compounds directly convertible into the present compound may be for example 1,11-imino-3-methoxy-estra-1,3,5(10)-trien-17-one;
1,11-imino-3-methoxyestra-1,3,5(10)-trien-17-one hydrochloride;
1,11-imino-3-hydroxyestra-1,3,5(10)-trien-17-one;
1,11-propionylimino-3-methoxyestra-1,3,5(10)-trien-17-one;
1,11-benzoylimino-3-methoxyestra-1,3,5(10)-trien-17-one;
1,11-(3',4',5'-trimethoxybenzoyl)imino-3-methoxyestra-1,3,5(10)-trien-17-one;
1,11-imino-3-hydroxyestra-1,3,5(10)-trien-17-one hydrochloride;
1,11-imino-3-hydroxyestra-1,3,5(10)-trien-17-one hydrosulfate;
1,11-acetylimino-3-methoxyestra-1,3,5(10)-trien-17-one;
1,11-N-methylimino-3-methoxyestra-1,3,5(10)-trien-17-one, and the like.

By heating the above 1,11-iminoestratrienes with palladium-on-carbon catalyst the following 1,11-iminoestratetraenes of the present invention are obtained:

1,11-imino-3-methoxyestra-1,3,5(10),9(11)-tetraen-17-one;
1,11-imino-3-methoxyestra-1,3,5(10),9(11)-tetraen-17-one hydrochloride;
1,11-imino-3-hydroxyestra-1,3,5(10),9(11)-tetraen-17-one;
1,11-propionylimino-3-methoxyestra-1,3,5(10),9(11)-tetraen-17-one;
1,11-benzoylimino-3-methoxyestra-1,3,5(10),9(11)-tetraen-17-one;
1,11-(3',4',5'-trimethoxybenzoyl)imino-3-methoxyestra-1,3,5(10),9(11)-tetraen-17-one;
1,11-imino-3-hydroxyestra-1,3,5(10),9(11)-tetraen-17-one hydrochloride;
1,11-imino-3-hydroxyestra-1,3,5(10),9(11)-tetraen-17-one hydrosulfate;
1,11-acetylimino-3-methoxyestra-1,3,5(10),9(11)-tetraen-17-one;
1,11-N-methylimino-3-methoxyestra-1,3,5(10),9(11)-tetraen-17-one, and the like.

The 1,11-iminoestratetraenes of the present invention when administered to rats produce a lowering of blood cholesterol and therefore are useful as hypocholesterolemic agents. They also show bactericidal and fungicidal activity.

The following examples describe in detail the preparation of representative 1,11-iminoestratetraenes of the present invention.

*Example 1.—1-(p-nitrophenylazo)-3-methoxy-4-amino-estra-1,3,5(10)-trien-17-one*

To a stirred solution of 7.0 g. (50.5 mmoles) of p-nitroaniline in 50 ml. of glacial acetic acid and 75 ml. of 2.0 N hydrochloric acid (150 mmoles) at −5° C. is added a solution of 3.48 g. (50.1 mmoles) of sodium nitrate in 15 ml. of water, below the surface of the liquid, and stirring is continued for 15 minutes. The resulting solution of p-nitrobenzene diazonium chloride is poured into a well stirred solution of 19.47 g. (50.0 mmoles) of 4-amino-3-methoxyestra-1,3,5(10)-trien-17-one (melting point 189°–193° C.) in 250 ml. of glacial acetic acid and 25 ml. 5.0 N sodium hydroxide (125 mmoles) at room temperature. The deep red mixture is diluted with one liter of water, allowed to stand overnight then filtered and the product washed thoroughly on the filter with water. The yield of crude material after drying was 21.0 g. (94%), melting point 185°–190° C.

The crude product, which contained some combined hydrogen chloride, is dissolved in methylene chloride (250 ml.), and then methanol (500 ml.) plus triethylamine (5.0 ml.) is added portionwise to the boiling solution until all of the methylene chloride had been removed. The resulting mixture gives 19.61 g. (87% yield) of very deep red crystals, melting point 242°–243° C. dec., which contains only minor impurities by thin layer chromatographic analysis and is sufficiently pure for the next step.

A pure sample is obtained by chromatography on activated magnesium silicate (60–100 mesh) using 15% ether-benzene as eluant. Crystallization of the product from methylene chloride-methanol, as above, gives material of melting point 243°–244° C. dec.

*Example 2.—1-(p-nitrophenylazo)-3-methoxyestra-1,3,5(10)-trien-17-one*

To a stirred solution of 17.94 g. (0.04 mole) of 1(p-nitrophenylazo)-3-methoxy-4-aminoestra-1,3,5(10)-trien-17-one (melting point 242–243° dec.) in 400 ml. of glacial acetic acid and 100 ml. of 30% (w./w.) aqueous sulfuric acid at 0° C. is added a solution of 3.04 g. (0.044 mole) of sodium nitrite in 30 ml. of water below the surface of the liquid. Stirring is continued at 0° C. for 15 minutes, then 450 ml. of 50% aqueous hydrophosphorus acid is added and the mixture stirred overnight (16 hours) at room temperature. The precipitate is filtered, washed thoroughly with water and dried to give 16.4 g. (95% yield) of crude red-brown product, melting point 203°–205° C. Crystallization from methylene chloride-methanol gives 15.31 g. (89% yield) of red crystals, melting point 216°–219° C. which contains only trace impurities by thin layer chromatographic analysis and is pure enough for the next step. Chromatography of a sample on activated magnesium silicate (60–100 mesh), using 5% ether-benzene as eluant, followed by crystallization of the product from methylene chloride-methanol gives an analytical sample, melting point 223–224° C.

*Example 3.—1-amino-3-methoxyestra-1,3,5(10)-trien-17-one*

A solution of 13.0 g. (0.03 mole) of 1-(p-nitrophenylazo)-3-methoxyestra-1,3,5(10)-trien-17-one (melting point 215°–217° C.) in 100 ml. of methylene chloride is added to a stirred mixture of 30 g. of zinc dust in 300 ml. of glacial acetic acid over approximately 10 minutes. The initial temperature of 23° soon rises to 40°–45° C. and is maintained in this range during the reaction by occasional cooling in a water bath. An additional 30 g. of zinc dust is added after half of the steroid is fed in. The mixture is stirred for a further 10 minutes then filtered and the residue of zinc washed on the filter with acetic acid. The filtrate is concentrated under reduced pressure to approximately 125 ml., diluted with 500 ml. of water and extracted with chloroform. The extract is washed with two portions of water, dried over magnesium sulfate, concentrated to a volume of 100 ml. and filtered through a bed of magnesium silicate (60 g.) using 300 ml. of chloroform wash. The filtrate is evaporated under reduced pressure to a small volume and crystallized from methanol to give 5.58 g. of grey solid melting point 198°–208° C. which contains a trace of p-phenylenediamine impurity. An additional 1.0 g. of product, melting point 209°–213° C. is obtained by chromatography of the filtrate on activated magnesium silicate (60–100 mesh) using 20% ethyl acetate-n-hexane as eluant, followed by crystallization of the product from methylene chloride-ether. The total yield of product is therefore 6.58 g. (73%).

Analytically pure material is obtained by chromatography of a sample on activated magnesium silicate as above, followed by crystallization from methanol to give a white crystalline product, melting point 213°–214° C.

*Example 4.—1-amino-3-methoxyestra-1,3,5(10)-trien-17β-ol*

Sodium borohydride (1.9 g.) is added to a suspension of 1-amino-3-methoxyestra-1,3,5(10)-trien-17-one (3.0 g.) in methanol (200 ml.). The resulting mixture is stirred for 30 minutes at room temperature, acidified with acetic acid and evaporated. The residue is partitioned between ether and water, and the ether phase is dried over anhydrous sodium sulfate and evaporated to give the product of the example.

*Example 5.—1-azido-3-methoxyestra-1,3,5(10)-trien-17-one*

To a stirred solution of 14.0 g. (0.046 mole) of 1-amino-3-methoxyestra-1,3,5(10)-trien-17-one (melting point 198°–208° C.) in 200 ml. of acetic acid plus 139.8 ml. (0.139 equivalent) of 1.0 N sulfuric acid at −20° C. (Dry Ice acetone bath) is added a solution of 3.55 g. (0.051 mole) of sodium nitrite in 10 ml. of water below the surface of the liquid. The solution is stirred for 2 minutes then a solution of 12.1 (0.186 mole) of sodium azide in 50 ml. of water is added as quickly as the resulting vigorous evolution of nitrogen would allow. The orange colored mixture is stirred at −10° to +5° C. for 30 minutes then extracted with chloroform and the extract washed with water, saturated sodium bicarbonate and finally with water. After drying over magnesium sulfate, the solution is evaporated under reduced pressure to an oil which crystallizes to a dark brown solid on cooling. The total crude product is chromatographed on 500 g. of activated magnesium silicate (60–100 mesh) using 7.5% ethyl acetate-n-hexane as eluant. The yield of cream colored solid is 12.1 g. (80%) melting point 144°–148° C. A single crystallization of a sample from methylene chloride-methanol gives analytical material with melting point 147°–149° C.

*Example 6.—1-azido-3-methoxy-1,3,5(10)-estratrien-17β-ol*

Following the procedure of Example 5 1-amino-3-methoxyestra-1,3,5(10)-trien-17β-ol is converted into the product of the example.

*Example 7.—1,11-imino-3-methoxyestra-1,3,5(10)-trien-17-one*

Solid 1-azido-3-methoxyestra-1,3,5(10)-trien-17-one (10 g., 0.031 mole, melting point 144°–148° C.) is added in one portion with stirring to hexadecane at 200° C. in an atmosphere of argon and heating continued for a total of five minutes. The hexadecane is previously purified by shaking with several portions of concentrated sulfuric acid followed by washing with water, drying over magnesium-sulfate and storing over molecular sieves. The reaction mixture is allowed to stand overnight at room temperature. Filtration gives 7.92 g. (86% yield) of crude product which is chromatographed on magnesium silicate (6.00 g. of 60–100 mesh). Elution with 15% and finally 20% ethyl acetate-petroleum ether (30–75°) gives 7.2 g. of product which still contains a less polar impurity. This is removed by dissolving the product in 250 ml. of 0.74 N hydrochloric acid and extracting the solution with ether. The product is recovered by making the aqueous phase basic with excess 5.0 N sodium hydroxide and extracting the precipitate with methylene chloride. Evaporation of the methylene chloride extract under reduced pressure gives an oil which crystallizes on trituration with ether giving 6.7 g. of cream colored product, melting point 192°–198° C. Crystallization from methanol gives 5.94 g. (65% yield) of white product melting point 199°–201° C. which is pure by thin layer chromatographic analysis.

An additional crystallization of a sample from methanol did not alter the melting point of 199°–201° C.

The 1,11-imino-compound is also prepared by irradiating with an Hanovia high pressure ultraviolet lamp a benzene solution of the 1-azido-compound.

*Example 8.—1,11-imino-3-methoxyestra-1,3,5(10)-trien-17β-ol*

Following the procedures of Example 7 1-azido-3-methoxyestra-1,3,5(10)-trien-17β-ol gives the product of the example.

*Example 9.—1,11-imino-3-methoxyestra-1,3,5(10), 9(11)-tetraen-17-one*

A mixture of 892.1 mg. (3.0 millimoles) of 1,11-imino-3-methoxyestra-1,3,5(10)-trien - 17 - one melting point 199°–201° C. and 300 mg. of 10% palladium-on-carbon in 45 ml. of xylene is stirred and refluxed for one hour. After cooling to room temperature, the mixture is filtered through 18 g. of magnesium silicate which is washed with n-hexane to remove the xylene and the product dissolved with 250 ml. of methylene chloride. Evaporation of the methylene chloride filtrate gives 846.6 mg. (95% yield) of white crystalline product, melting point 197°–201° C. Crystallization from methanol in the presence of one drop of pyridine gives 738.5 mg., melting point 202°–204° C., plus a second crop of 56 mg., melting point 199°–203° C. Hence, a total yield of crystallized product is 794 mg. (90%). A single recrystallization from methanol gives an analytically pure sample, melting point 203°–205° C.

*Example 10.—1,11-imino-3-methoxyestra-1,3,5(10), 9(11)-tetraen-17β-ol*

Following the procedure of Example 9 1,11-3-methoxyestra-1,3,5(10)-trien-17β-ol gives the product of the example.

*Example 11.—1,11-imino-3-methoxyestra-1,3,5(10), 9(11)-tetraen-17-one hydrochloride*

Treatment of 1,11-imino - 3 - methoxyestra-1,3,5(10), 9(11)-tetraen-17-one in a mixture of ether and chloroform with hydrogen chloride gives the product of the example.

*Example 12.—1,11-imino-3-hydroxyestra-1,3,(10), 9(11)-tetraen-17-one*

Treatment of 1,11-imino - 3 - methoxyestra-1,3,5(10), 9(11)-tetraen-17-one with pyridine hydrochloride gives the product of the example.

*Example 13.—1,11-iminoestra-1,3,5(10),9(11)-tetraene-3,17β-diol*

Treatment of 1,11-imino - 3 - methoxyestra-1,3,5(10), 9(11)-tetraen-17β-ol with pyridine hydrochloride gives the product of the example.

*Example 14.—1,11-acetylimino-3-methoxyestra-1,3,5-(10),9(11)-tetraen-17-one*

To a solution of 0.5 g. of 1,11-imino-3-methoxyestra-1,3,5(10),9(11)-tetraen-17-one in 10 ml. of pyridine is added 10 ml. of acetic anhydride. The mixture is heated on a steam bath for 1 hour and then allowed to stand at room temperature overnight. The excess acetic anhydride is decomposed with methanol and the solution is evaporated. The residue is partitioned between ether-methylene chloride (2:1) and 5% sodium carbonate solution. The organic phase is dried and evaporated to give the product of the example.

*Example 15.—1,11-propionylimino-3-methoxyestra-1,3,5(10),9(11)-tetraen-17-one*

Treatment of 1,11-imino - 3 - methoxyestra-1,3,5(10), 9(11)-tetraen-17-one in pyridine with propionic anhydride on the steam bath for 1 hour followed by standing overnight at room temperature gives the product of the example.

*Example 16.—1,11-benzoylimino-3-methoxyestra-1,3,5(10),9(11)-tetraen-17-one*

Substitution of benzoyl chloride for propionic anhydride in Example 15 gives the product of the example.

*Example 17.—1,11-(3',4',5'-trimethoxybenzoyl)-iminoestra-1,3,5(10),9(11)-tetraen-17-one*

Substitution of 3,4,5-trimethoxybenzoyl chloride for propionic anhydride in Example 15 gives the product of the example.

*Example 18.—1,11-N-methylimino-3-methoxyestra-1,3,5(10),9(11)-tetraen-17-one*

A solution of 1,11-imino-3-methoxyestra-1,3,5(10), 9(11)-tetraen-17-one in 20% dimethylformamide-benzene is treated with sodium hydride and methyl iodide. The mixture is heated at 40° C. for 1 hour, cooled and extracted with benzene. The extract is washed with water and evaporated to give the N-methyl derivative, the product of the example.

*Example 19.—1,11-N-methylimino-3-methoxyestra 1,3,5(10),9(11)-tetraen-17-one methiodide*

A solution of 1,11-N-methylimino-3-methoxyestra-1,3, 5(10),9(11)-tetraen-17-one in ether-methanol is treated with methyl iodide to give the methiodide.

*Example 20.—1,11-imino-3-hydroxyestra-1,3,5(10), 9(11)-tetraen-17-one hydrochloride*

Treatment of 1,11 - imino-3-hydroxyestra-1,3,5(10), 9(11)-tetraen-17-one in a mixture of ether and hydrogen chloride gives the product of the example.

*Example 21.—1,11-imino-3-methoxyestra-1,3,5(10), 9(11)-tetraen-17-one hydrosulfate*

Treatment of 1,11 - imino-3-hydroxyestra-1,3,5(10), 9(11)-tetraen-17-one in a mixture of ether and methanol with sulfuric acid gives the product of the example.

*Example 22.—1,11-imino-17α-ethynylestra-1,3,5(10), 9(11)-tetraene-3,17β-diol*

A solution of potassium acetylide in liquid ammonia is prepared by bubbling acetylene into a solution containing 3 g. of potassium in 150 ml. of liquid ammonia until the blue color disappears. To it is added dropwise a solution of 1.3 g. of 1,11-imino-3-hydroxyestra-1,3,5(10), 9(11)-tetraen-17-one in 75 ml. of ether. After 2 hours the cooling bath is removed and the mixture is allowed to warm to room temperature and stored overnight. Dilute sulfuric acid (8%, 70 ml.) is added dropwise to the mixture and it is extracted with ether. The extract is washed with saturated sodium chloride solution, dried and evaporated to give the product of the example.

*Example 23.—1,11-imino-17α-vinylestra-1,3,5(10), 9(11)-tetraene-3,17β-diol*

A mixture of 0.15 g. of 1,11-imino-17α-ethynylestra-1,3,5(10),9(11)-tetraene-3,17β-diol, 0.1 g. of 5% palladium on calcium carbonate catalyst and 15 ml. of pyridine is stirred under an atmosphere of hydrogen until one equivalent of hydrogen is taken up. The catalyst is removed by filtration, and the filtrate is evaporated to dryness in vacuo to give the product of the example.

*Example 24.—1,11-imino-17α-methylestra-1,3,5(10), 9(11)-tetraene-3,17β-diol*

To a freshly prepared solution of methyl magnesium iodide (4.2 ml. of methyl iodide and 1.6 g. of magnesium turnings) in ether (30 ml.) is added a solution of 1,11-imino-3-hydroxyestra-1,3,5(10),9(11)-tetraen-17-one (0.9 g.) in ether (25 ml.). The resulting mixture is heated to reflux for 6 hours, cooled and quenched by the dropwise addition of excess ammonium chloride solution. The ether phase is separated and the aqueous phase is extracted several times with methylene chloride. The combined extracts are washed with water, dried and evaporated to give the product of the example.

We claim:
1. A compound of the formula:

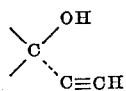

wherein R is selected from the group consisting of hydrogen and lower alkyl; R' is selected from the group consisting of hydrogen, lower alkyl, lower alkanoyl, mono-nuclear aroyl, and lower alkoxy mono-nuclear aroyl; X is selected from the group consisting of

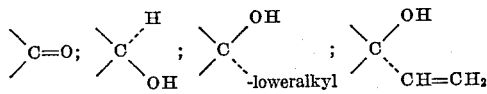

and

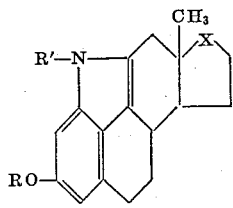

and acid addition and quaternary ammonium salts thereof.

2. The compound 1,11 - imino - 3 - methoxyestra-1,3,5(10),9(11)-tetraen-17-one.
3. The compound 1,11 - imino - 3 - methoxyestra-1,3,5(10),9(11)-tetraen-17-one hydrochloride.
4. The compound 1,11 - imino - 3 - hydroxyestra-1,3,5(10),9(11)-tetraen-17-one.
5. The compound 1,11 - imino - 3 - hydroxyestra-1,3,5(10),9(11)-tetraen-17-one hydrochloride.
6. The compound 1,11 - imino - 3 - hydroxyestra-1,3,5(10),9(11)-tetraen-17-one hydrosulfate.
7. The compound 1,11 - imino - 3 - methoxyestra-1,3,5(10),9(11)-tetraen-17β-ol.
8. The compound 1,11 - iminoestra - 1,3,5(10),9(11)-tetraene-3,17β-diol.
9. The compound 1,11 - acetylimino - 3 - methoxyestra-1,3,5(10),9(11)-tetraen-17-one.
10. The compound 1,11 - propionylamino - 3 - methoxyestra-1,3,5(10),9(11)-tetraen-17-one.
11. The compound 1,11 - benzoylimino - 3 - methoxyestra-1,3,5(10),9(11)-tetraen-17-one.
12. The compound 1,11 - (3',4',5' - trimethoxybenzoyl)iminoestra-1,3,5(10),9(11)-tetraen-17-one.
13. The compound 1,11 - N - methylimino - 3 - methoxyestra-1,3,5(10),9(11)-tetraen-17-one.
14. The compound 1,11 - N - methylimino - 3 - methoxyestra-1,3,5(10),9(11)-tetraen-17-one methiodide.
15. The compound 1,11 - imino - 17α - ethynylestra-1,3,5(10),9(11)-tetraene-3,17β-diol.
16. The compound 1,11 - imino - 17α - vinylestra-1,3,5(10),9(11)-tetraene-3,17β-diol.
17. The compound 1,11 - imino - 17α - methylestra-1,3,5(10),9(11)-tetraene-3,17β-diol.

No references cited.

LEWIS GOTTS, *Primary Examiner.*

E. L. ROBERTS, *Assistant Examiner.*